United States Patent [19]

Blackington

[11] Patent Number: 4,518,856
[45] Date of Patent: May 21, 1985

[54] LINE SENSING METHOD AND APPARATUS
[75] Inventor: Paul A. Blackington, Vandling, Pa.
[73] Assignee: Sheltered Workshop for the Disabled, Inc., Binghamton, N.Y.
[21] Appl. No.: 418,006
[22] Filed: Sep. 14, 1982
[51] Int. Cl.³ .............................................. G05B 1/00
[52] U.S. Cl. .................................. 250/202; 356/401; 250/557
[58] Field of Search ............... 250/227, 202, 548, 557, 250/203; 356/400, 401

[56] References Cited
U.S. PATENT DOCUMENTS

| 3,502,880 | 3/1970 | Martinek et al. | 250/202 |
| 4,146,797 | 3/1979 | Nakagawa | 250/548 |
| 4,340,950 | 7/1982 | Kosaka | 250/202 |
| 4,370,059 | 1/1983 | Masuda | 250/548 |
| 4,379,225 | 4/1983 | Apothaker | 250/227 |
| 4,406,000 | 9/1983 | Shoji et al. | 250/202 |

Primary Examiner—David C. Nelms
Assistant Examiner—Jim Gatto
Attorney, Agent, or Firm—Richard G. Stephens

[57] ABSTRACT

An optical thin line-tracking sensor comprises a small member mounting ends of a light source fiber and a pair of receiving fibers which receive reflected light. Reflected light transmitted through the receiving fibers operate photosensors whose outputs are differentially combined to provide a tracking error signal. Augmenting circuits enable operation over a wide range. Means to sense other indicia carried on a web or sheet are disclosed. A line-tracking head which includes a laser-light cutter is also disclosed.

8 Claims, 14 Drawing Figures

LINE SENSING METHOD AND APPARATUS

This invention relates to sensing method and apparatus which is useful for sensing lateral deviations, line crossings or angular movement of a sensing head from a line drawn, printed or otherwise affixed to a background having a contrasting energy-reflective property, and for providing electrical signals representative of such deviations, crossings or angular movements. Such apparatus finds wide utility in a variety of industrial applications, particularly in the control of moving webs or apparatus used to process a moving web. In many such applications error signals commensurate with lateral deviations will be applied to servomotor apparatus which causes the sensing head to track a relatively moving line with a minimum deviation.

In various applications it is desirable to sense deviation of a very thin line with great sensitivity, and provision of sensing method and apparatus having great sensitivity is one object of the invention. Another object of the invention is to provide a sensor assembly capable of detecting the position of a very thin line without the use of lenses. In accordance with one aspect of the present invention a sensing head includes a source optic fiber which transmits light toward a sheet carrying a line to be followed, and a pair of receiving optic fibers in the sensing head receive amounts of reflected light which vary with the lateral position of the line and apply the light to respective photosensors, and the photosensor outputs are differentially combined to provide an error signal commensurate with lateral deviation of the line relative to a reference position on the sensing head. The broad idea of using optic fibers for line tracking is not per se new; cables formed of a large number of fibers have been used for line tracking, with the total amount of light transmitted through the cable being compared with a standard. Such arrangements are incapable of tracking a very thin line such as a line only 30 mils (0.030 inch) in width, for example.

In some applications it is highly desirable that an optical sensing head be very small and have minimum weight, and provision of a sensor having such characteristics is one important object of the invention. In various applications it is desirable that such sensing head generate little or no heat in the area in which it operates, and provision of a sensing head having such a characteristic is another object of the invention. In various applications it is desirable that error signals from a sensing head not be adversely affected by strong electric or magnetic fields in the area in which it operates, and provision of such a sensing head is another object of the invention. In some applications it is important that a sensing head be immune to vibration and shock, and provision of such a sensing head is a further object of the invention. Yet another object of the invention is to provide a line-following sensing device which is simple and economical to construct, and yet rugged and reliable.

In various web reeling and sheet feeding applications it is desirable to perform various operations on a traveling web at precise locations by providing operating signals at the proper times to various devices stationed adjacent the path of the web. It often is desirable to provide what will be termed a "sync" signal to indicate a substantial time period during which various operations can be performed, and also to provide "event" signals during the period of the sync signal to indicate precise times at which various operations should be performed. Another object of the invention is to provide method and apparatus which will provide such sync and event signals in an accurate and reliable manner. While various aspects of the invention will be illustrated in connection with a web reeling application, it will become apparent that they are applicable as well to a variety of other applications, such as sheet feeding operations.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 2:
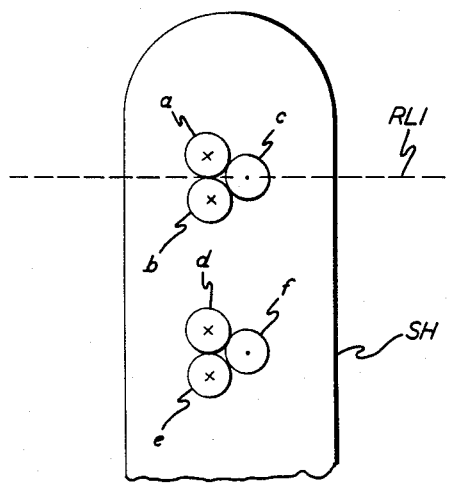
FIG. 2 illustrates in greatly enlarged form a portion of the bottom surface of an exemplary sensing head portion of the invention.
Figure 2A:
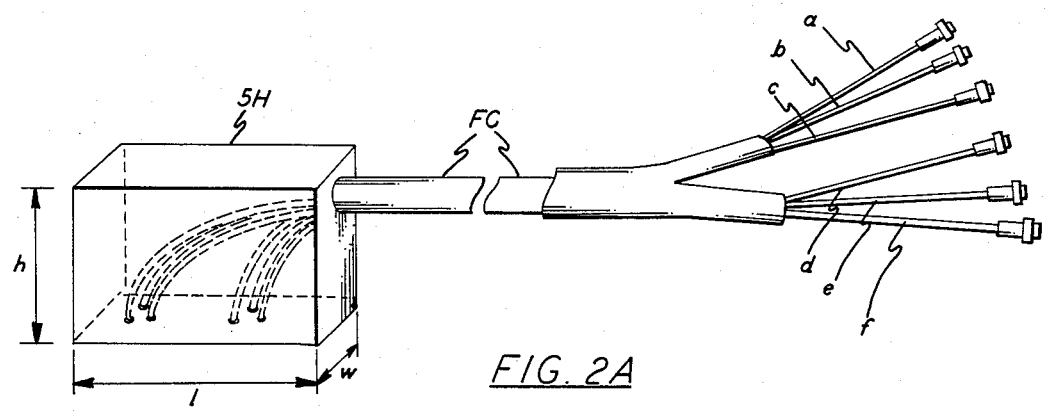
FIG. 2a is an isometric view of an exemplary sensing head-fiber cable assembly according to the invention.
Figure 2B:
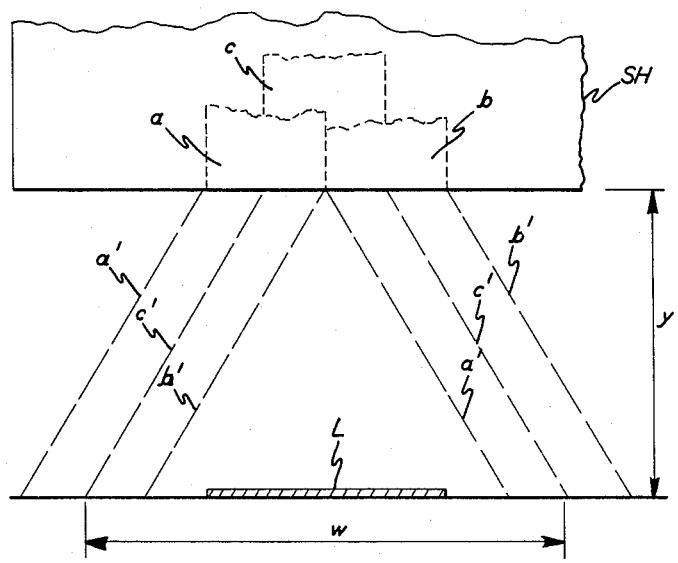
FIG. 2b is an elevational diagram useful in describing various relationships between the sensing head and a line of contrasting energy-reflective property carried on a web.
Figure 2C:
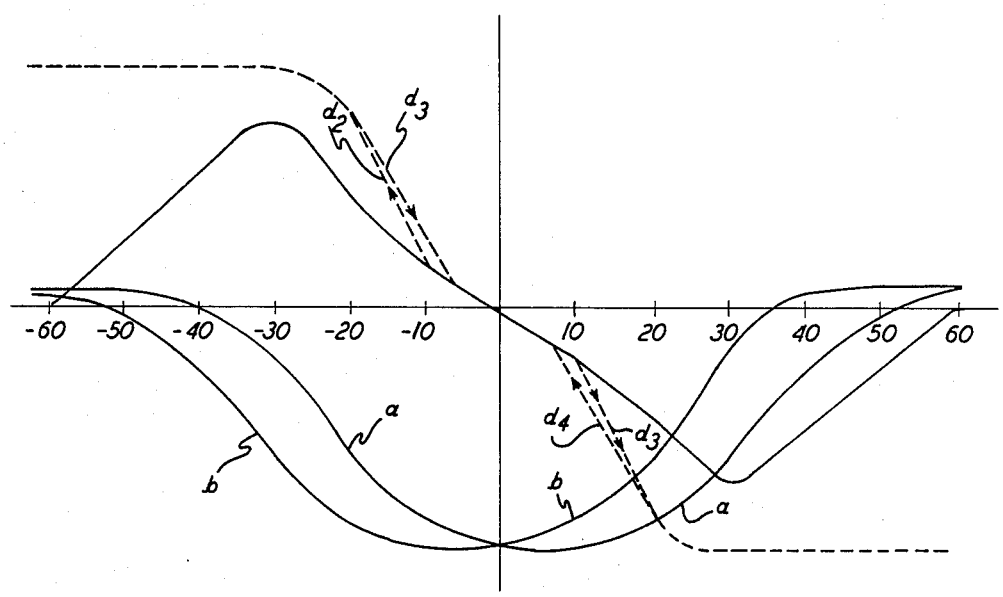

FIG. 2c contains a plurality of curves illustrating the variation in light received by two sensing head optical fibers of the exemplary sensing head as the lateral position of the head varies relative to a line on a web, the variation in voltage of the light from those two fibers is applied to photosensors and differentially combined, and the manner in which the variation of that voltage with the lateral position may be varied by logic circuitry provided in accordance with the invention.

Figure 3A:
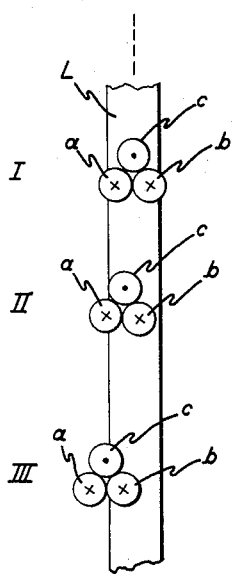
Figure 3B:
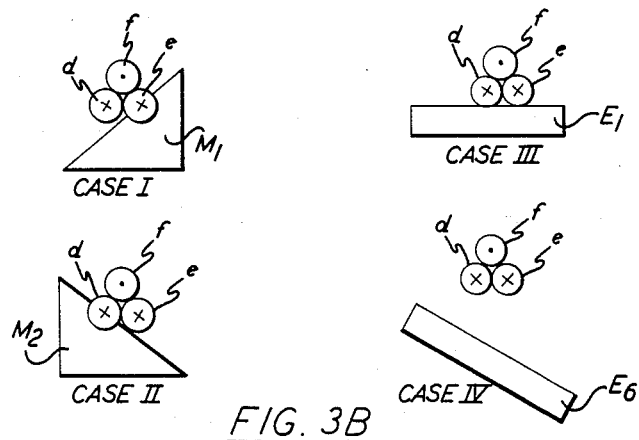

FIG. 3a illustrates a trio of opitcal fibers at three different lateral positions relative to a line to facilitate description of the operation of the sensing head as a line is being tracked, and FIG. 3b illustrates a trio of optical fibers at four different positions relative to indicia carried on a web to facilitate description of how sync and event signals are provided in accordance with the invention.

Figure 4:
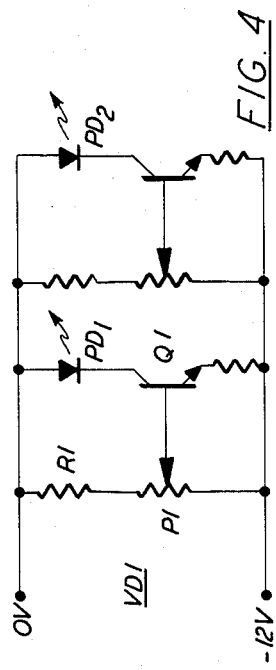

FIG. 4 illustrates exemplary light source apparatus for applying light to the sensing head of the invention.

Figure 5:
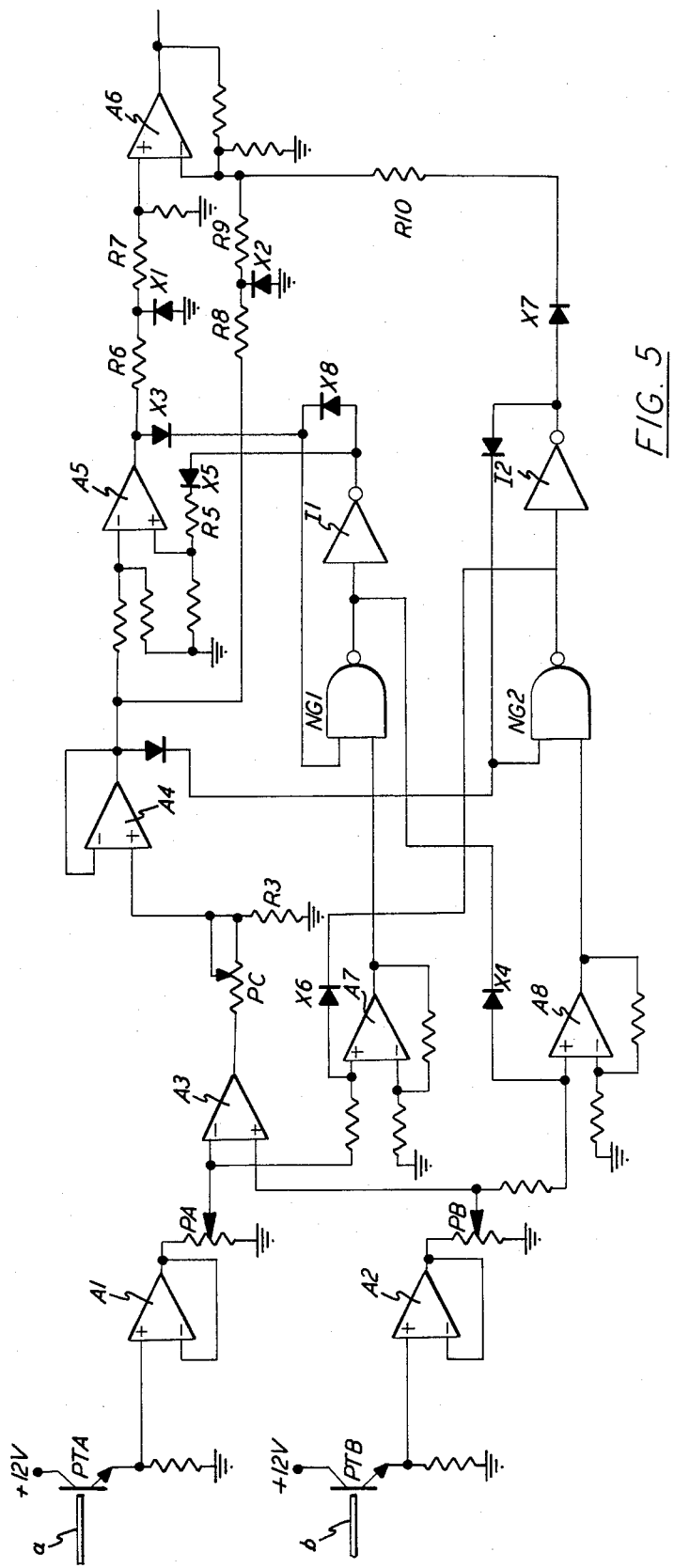

FIG. 5 is an electrical schematic diagram illustrating a preferred form of apparatus for providing a line-tracking error signal.

Figure 6:
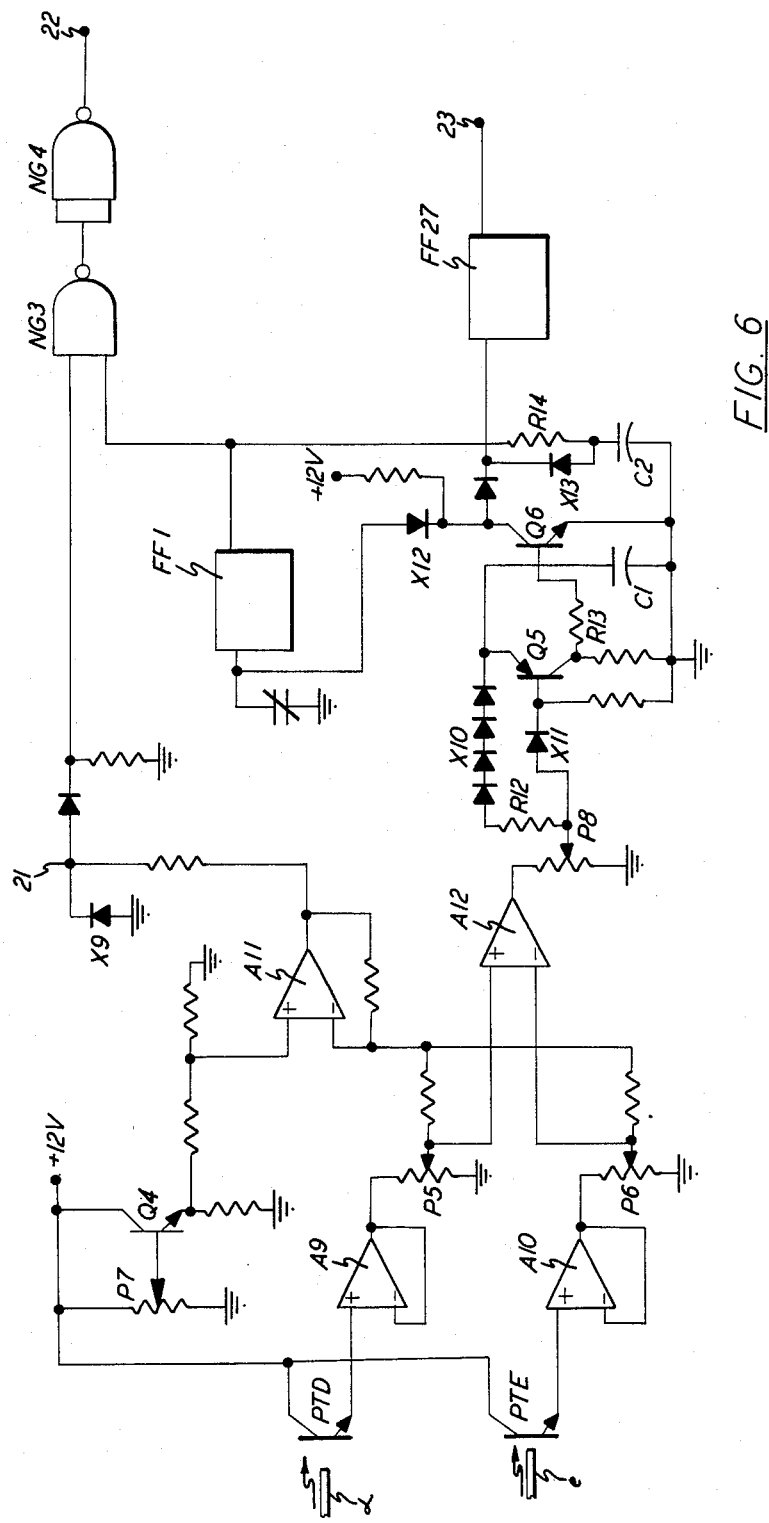

FIG. 6 is an electrical schematic diagram illustrating a preferred form of apparatus for providing sync and event signals.

Figure 7:
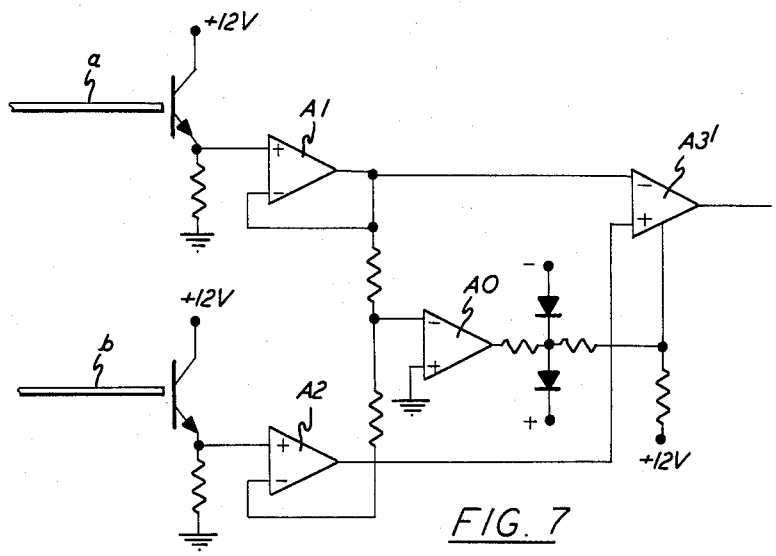

FIG. 7 is an electrical schematic diagram illustrating one possible modification to the circuit of FIG. 5.

Figure 8:
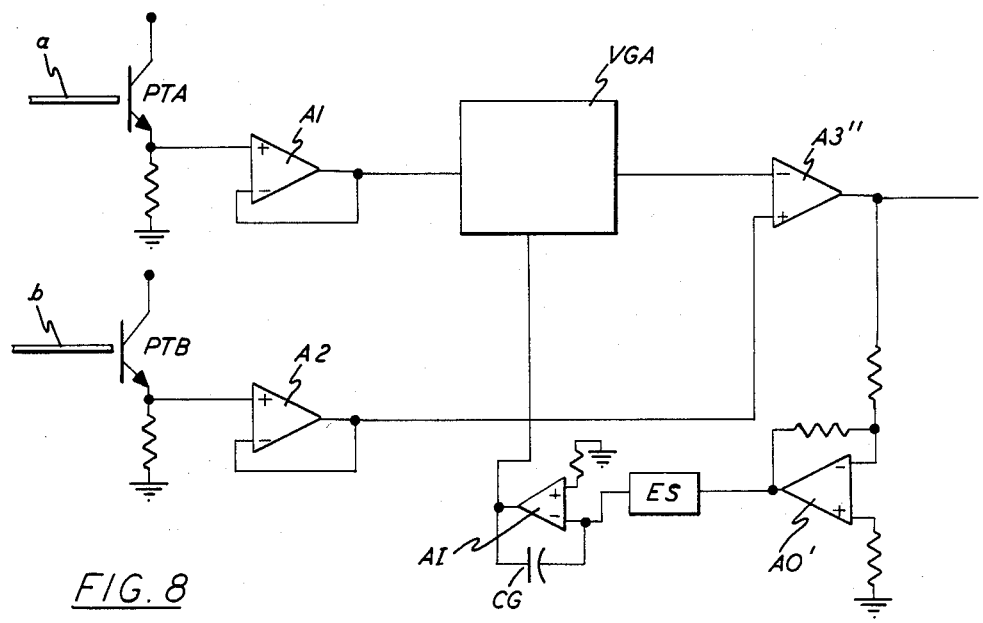

FIG. 8 is an electrical schematic diagram illustrating another possible modification to the apparatus of FIG. 5.

Figure 9A:
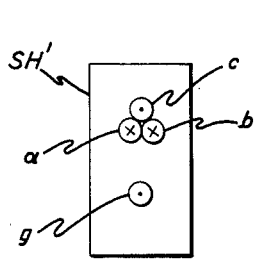

FIG. 9a illustrates the bottom surface of a modified form of tracking head which also includes an optical fiber cutting means.

Figure 9B:
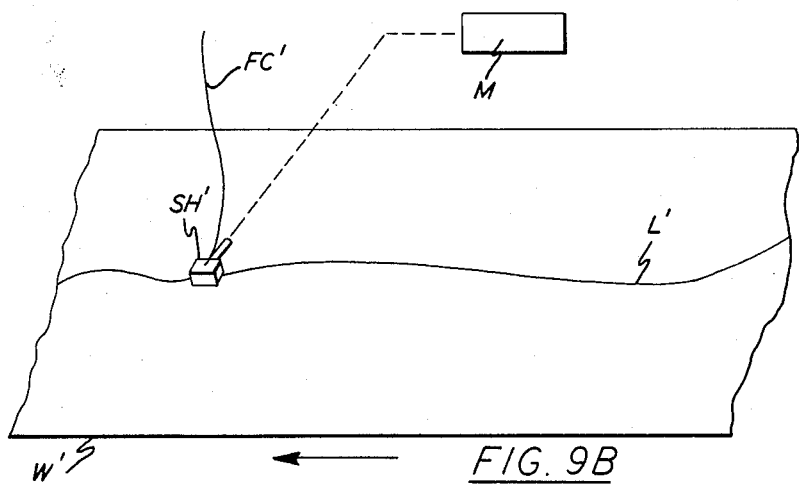

FIG. 9b is an isometric view illustrating an exemplary use of the cutting head of FIG. 9a to slit a moving web along a line inscribed on the web.

Figure 1:
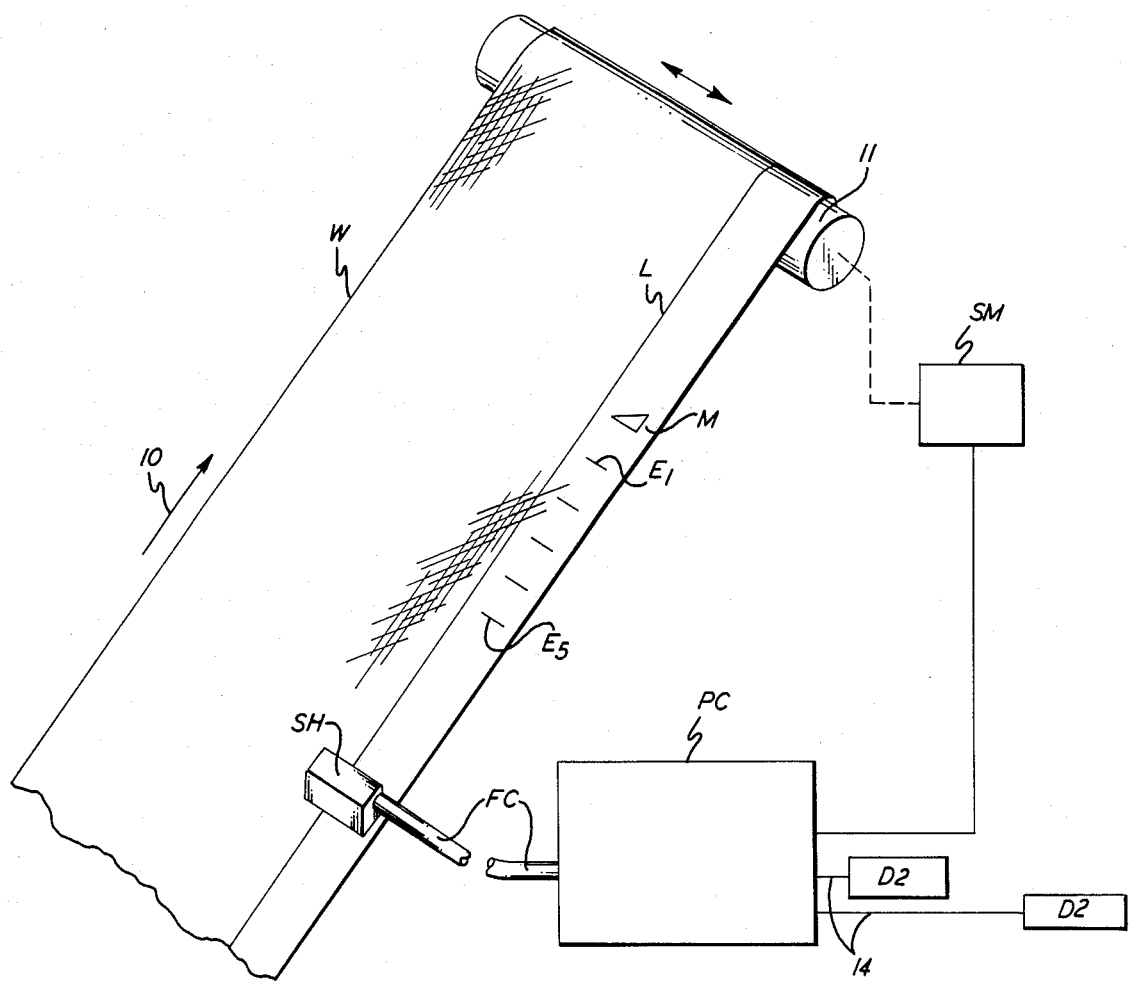
FIG. 1 illustrates use of the invention in connection with a web reeling application, with portions of the invention shown in block form.

In an exemplary application of the invention partially depicted in FIG. 1, a web W, being reeled in the direction indicated by arrow 10 by roll 11 and other means (not shown), carries a thin lengthwise-extending line L having an energy-reflective property (e.g. color) contrasting with that of the web in general. In a typical application line L may have a width of 0.030–0.040 inch (0.76–1.02 mm.), for example. At various places along web W various event signalling indicia are located adjacent line L, such as the triangular mark shown at M, and the short lines E1 to E5. Mark M and lines E1 to E5 also have an energy-reflective property contrasting with that of web W. As such a web is reeled, successive portions of line L and successive sets of indicia generally of the nature depicted by mark M and lines E1 to E5 pass beneath a stationary sensing head SH which is positioned by means of a bracket (not shown) just above web W, almost but not quite contacting the upper surface of web W, with a separation of 0.040–0.050 inch (1.02–1.27mm.) in a typical application.

As line L and the other indicia on web W pass beneath sensing head SH, the sensing head causes optical signals to be sent via an optical fiber cable FC to processing circuitry shown in block form at PC and in detail in FIGS. 5 and 6. The processing circuitry provides an electrical lateral deviation error signal to conventional servomotor apparatus SM, which laterally adjusts roll 11 to maintain line L centered below a reference portion of head SH. The processing circuitry also provides electrical signals (on other lines 14,14) which may be used to control a variety of different forms of other devices (not shown) which may perform various processes on portions of web W.

In greatly enlarged FIG. 2 illustrating the lower surface of sensing head SH, two trios of optic fibers extending through the sensing head terminate flush with the lower surface of the head, each trio being spaced together with their centers arranged in an equilateral triangular configuration. In a typical application each optic fiber may have a diameter of 0.020 inch (0.51 mm.) and comprise a plastic optic fiber. The trio of fibers a, b and c operate to sense lateral deviation of line L on the web from a reference line RL1. The trio of fibers d, e and f operate to provide signals as indicia such as mark M and lines E1 to E5 (FIG. 1) pass beneath sensing head SH. In FIG. 2 fibers c and f are shown with central dots, indicating that they are light source fibers, i.e. that light passes out from those fibers downwardly toward web W, while fibers a, b, d and e are shown with central cross marks, indicating that light is reflected into these fibers from web W.

It is not necessary that receiving fibers a, b, d and e have the same diameter as the source fibers. Source fiber c, for example, can have a substantially larger diameter than receiving fibers a and b, in which case the centers of that trio of fibers would be arranged in an isosceles triangle configuration. The center of the source fiber defines reference line RL1, and the centers of receiving fibers a and b should be located at equal distances on opposite sides of that reference line, with fibers a and b having the same diameter as each other. In some applications, particularly where source fiber c has a larger diameter than receiving fibers a and b, it is not necessary that the ends of receiving fibers a and b touch each other.

As shown in FIG. 2a the fibers a–f are routed inside head SH to one side of the head, and exit from the head as a fiber cable or bundle FC. The head may be formed of metal, but in many applications a simple molded plastic block will be preferred. In one exemplary sensing head, the height h, length l and width w of the head were 0.935, 0.980 and 0.190 inch (2.37, 2.49, and 0.48 cm.), respectively. However, the sensing head may be made much, much smaller, and so as to have very little weight and occupy very little space. A sensing head connected to six 20-mil diameter fibers can readily be made no larger than 0.25 inch (0.64 cm.) cube. While the fibers a–f in FIG. 2a are shown bent 90 degrees inside the sensing head, they can instead pass esssentially straight through the sensing head. The length of fiber cable FC is quite optional in applications where sensing head SW is mounted stationary. In applications where the head is moved by a motor or equivalent motive means, the length of cable FC ordinarily will be made long enough that the force required to flex the fibers as the head moves does not appreciably load the motive means. In FIG. 2a each of the fibers a–f is shown carrying a conventional end connector which situates the fiber end closely adjacent a respective photosensor or a light source. In the specific embodiment being described, the ends of fibers c and f are affixed to photodiode light sources PD1 and PD2 (FIG. 4), respectively, the ends of fibers a and b are connected to phototransistors PTA and PTB (FIG. 5), respectively, and the ends of fibers d and e terminate at phototransistors PTD and PTE (FIG. 6), respectively.

In FIG. 2b where sensing head SH is shown stationed directly above line L on web W, source fiber c casts a beam of light toward the web, the edges of the source beam being indicated at c',c'. Receiving fiber a views an area on the web encompassed by lines a',a', and receiving fiber b views an area encompassed by lines b',b'. The width of the area on which source fiber c casts light, and the widths of the areas from which receiving fibers a and b may receive reflected light, depend upon the numerical apertures of the respective fibers, and upon the distance y of the ends of the fibers above web W. In FIG. 2b each beam encompasses an angle of 61.5 degrees, a typical value for plastic optic fibers.

With head distance y above the web, the source beam (encompassed by lines c',c') preferably illuminates a strip area having a width w greater than the width of line L, so that some appreciable light is reflected back into receiving fibers a and b when the sensing head is perfectly centered over line L, as shown. The intensity of the light in the source beam is greatest at the central axis of the beam, and diminishes outwardly toward each of lines c',c' and that causes the amounts of light reflected into fibers a and b to change as soon as there is any lateral deviation of the sensing head from the centered condition shown, even though each of fibers a and b is initially viewing web areas on both sides of line L. As head SH is moved progressively leftwardly as viewed in FIG. 2b an increasing amount of light is reflected into fiber a, and a decreasing amount of light is reflected into fiber b. Eventually dark line L does not appreciably occlude reflection into fiber a, so that the light reflected into fiber a reaches a maximum. Leftward movement causes decreasing light to be reflected into fiber b until line L is centered within the area (encompassed by lines b',b') viewed by fiber b, and then further leftward movement causes an increasing amount of light to be reflected into fiber b.

In FIG. 2c the ordinates of curves a and b diagrammatically represent the amounts of light received by fibers a and b, respectively, as the sensor head is moved in either direction from a centered position. Curves a and b are mirror-images of each other about the vertical axis, due to symmetry, and these curves also can be deemed to represent output signals from identical photosensors coupled to fibers a and b. Curve d represents the electrical voltage which may be obtained by simple differential combination of the outputs of two such photosensor signals. After the differential signal reaches a maximum value for lateral deviation in either direction, it will be seen to undersirably decrease toward zero for still larger deviations. Such a differential signal cannot be used as the error signal in many control applications, or else various large or sudden deviations would result in loss of system control. In accordance with one aspect of the present invention, added logic circuitry (illustrated in FIG. 5) is utilized to augment the error signal obtained by differential combination, to provide a modified error signal versus lateral deviation characteristic for large deviations of the nature indicated by dashed lines in FIG. 2c.

Operation of the electronic circuitry of processing circuitry PC can be more easily understood by prior consideration of the light signals reflected into the receiving fibers under different operating conditions. In FIG. 3a the guide line tracking fibers a, b, c are shown relative to line L under several different operating conditions. In Case I at the top of FIG. 3a the center of source fiber c is located over the centerline of line L, and the centers of receiving fibers a and b are equal distances on opposite sides of the centerline of line L. Under such conditions equal amounts of light are reflected from the web into receiving fibers a and b. The equal amounts of light cause equal electrical signals from a pair of photosensors connected to fibers a and b, as will be shown below, and when combined differentially, the two electrical signals provide a zero error signal, which represents perfect alignment of the sensing head over line L. It may be noted that if the height of the sensing head above the web varies, the amounts of light received by fibers a and b will vary, but because they will vary in the same manner, the differential output signal will remain zero. Thus when the system is closely tracking line L, flutter in web W causes little system disturbance.

In Case II in FIG. 3a the sensing head is shown shifted leftwardly from the centerline of line L. The area on web W viewed by fiber a is less occluded by dark line L, and the area on web W viewed by fiber b is more occluded by line L, so that more light is reflected into fiber a and less light is reflected into fiber b, resulting in an error signal having a given polarity, as will be shown below. As the sensing head moves from the centered position of Case I to the deviated position of Case II, the amounts of light received by fibers a and b and the resultant differential electrical signal each vary proportionally. If the sensing head is instead shifted rightwardly, an error signal of opposite polarity will occur.

As the sensing head moves to a position such as that shown at Case III in FIG. 3a, fiber a receives the maximum amount of reflected light which it can receive and fiber b is receiving only a very small amount of light so that a maximum error signal results. If the sensing head were moved further leftwardly from the position shown at Case III, it will be seen that the light reflected into fiber a would not further increase, but that the light reflected into fiber b would increase, thereby undesirably decreasing the error signal as greater deviation occurred, and tending to allow system operation only over a very small range of lateral deviation. As will be shown below, error signal augmenting circuitry is provided to allow system operation over a wider range of lateral deviation.

In FIG. 3b optical fibers d, e and f are shown at several different positions relative to marks $M_1$, $M_2$ and $E_1$ assumed to be carried on a web assumed to be moving upwardly in FIG. 3b. In Case I dark indicium $M_1$ is occluding some light which otherwise would be reflected into fiber e, while a maximum amount of light is reflected into fiber d. Conversely in Case II, indicium $M_2$ occludes light from fiber d while maximum light is received by fiber e. If the electrical signals resulting from the light received by fibers d and e are combined differentially, the resulting differential signal will comprise a momentary pulse having one polarity when indicium $M_1$ passes under the sensing head, and a momentary pulse having the opposite polarity when indicium $M_2$ passes under the sensing head. It may be noted that pulses will not occur as the lower (in FIG. 3b) edges of indicia $M_1$ and $M_2$ pass beneath the sensing head, since the amounts of light reflected to the two receiving fibers d and e change similarly and coincidentally.

It may be further noted that the precise times at which the mentioned momentary pulses occur will depend not only upon the longitudinal positions of indicia $M_1$ and $M_2$ along the web, but also to a slight degree upon the lateral positions of indicia $M_1$ and $M_2$. In other words, the times of occurrence of the momentary pulses will vary slightly depending upon how closely the sensing head is tracking line L when the indicia $M_1$ and $M_2$ are encountered.

In Case III in FIG. 3b, fibers d and e encounter indicium E1 simultaneously, so that a differential circuit responsive to the light signals from those two fibers provides no signal when indicium E1 is encountered. However, if a circuit responsive to the light from fibers d and e is arranged to act cumulatively instead of differentially, it will provide a pulse signal as indicium E1 is encountered. If the upper edge of indicium E1 is perpendicular to line L on the web, and if indicium E1 is not located a large lateral distance from line L, the time of occurrence of the pulse provided by the cumulative circuit will not vary appreciably with how closely line L is being tracked at the time indicium E1 is encountered.

In Case IV in FIG. 3b, the occlusion of light from fiber d will provide a momentary pulse of one polarity. That pulse will decrease to zero when light is similarly occluded from fiber e, and thus the base width of the pulse will be commensurate with the slope of line E6 relative to the web travel direction. Next, emergence of the field of view of fiber d from the area occluded by indicium E6 will cause a momentary pulse of opposite polarity, which also will decrease to zero as the field of view of fiber e emerges from the area occluded by indicium E6, and hence the second pulse also will have a base width commensurate with the slope of indicium E6. The time difference between the leading edges of the two pulses will be a measure of the thickness (measured in the direction of web travel) of the indicium E6.

Referring to FIG. 4, voltage from a 12-volt regulated supply (not shown) is applied across an adjustable voltage divider VD1 comprising resistor R1 and potentiometer P1 to establish the current flowing in the base-emitter and collector circuits of transistor Q1, and thereby the current flowing through and the light emitted by photodiode PD1. The light from PD1 is applied to one end of source optic fiber c. An identical circuit controls the light emitted from photodiode PD2, which light is coupled into one end of source optic fiber f. Incandescent light sources may be used in lieu of photodiodes, if desired.

Referring to FIG. 5, the light from fibers a and b are applied to phototransistors PTA and PTB, respectively, providing voltages at their emitters directly proportional to the amounts of light received by those phototransistors. The emitter voltages are applied to respective voltage follower amplifiers A1 and A2, the output voltages of which are applied to respective potentiometers PA and PB. The output voltages from the wiper arms of potentiometers PA and PB are connected to the inverting and non-inverting input terminals, respectively, of differential amplifier A3, thereby providing an output voltage commensurate with the difference between the amounts of light received by fibers a and b, and hence a signal commensurate with the deviation of the sensing head from line L on the web. Potentiometers PA and PB may be adjusted to provide zero output from amplifier A3 when the sensing head views a reflective surface, without a line L, thereby to balance out any difference in the losses in fibers a and b, and any difference between the gains of phototransistors PTA and PTB.

The output voltage of amplifier A3 is applied to a voltage divider comprising potentiometer PC and resistor R3 to allow a desired portion of that voltage to be selected, in order to establish a desired loop gain for the web lateral deviation control system being described. The value of loop gain utilized will vary widely in different applications, of course, and in the case of the system of FIG. 1 the proper loop gain will depend upon such things as the inertia (mass) and friction associated with servomotor SM and lateral movement of roll 1. The voltage from potentiometer PC is applied through voltage follower amplifier A4 and a unity-gain inverting amplifier A5 to a resistor-diode network comprising resistors R6, R7 and diode X1. The output voltage of voltage follower amplifier A4 is also applied via a resistor-diode network comprising resistors R8, R9 and diode X2 to the inverting input terminal of output amplifier A6. Diode X1 will be seen to prevent a negative output from amplifier A5 from affecting the output of amplifier A6 when the outputs of amplifiers A3 and A4 are positive, and diode X2 will be seen to prevent a negative output from A4 from affecting the output of amplifier A6 when the outputs of amplifiers A3 and A4 are negative. Within a certain range of deviations from a balanced condition in either direction, the outputs of logic inverters I1 and I2 in FIG. 5 are low, so that signal inputs are not applied to amplifier A5 via diode X5 and resistor R5, nor to amplifier A6 via resistor R10 and diode X7. Thus for small deviations the output signal from amplifier A6 is proportional to the output of amplifer A4. If fiber a is receiving less light than fiber b, so that the outputs of amplifiers A3 and A4 are positive, the negative output of amplifier A6 is proportional in magnitude to the input current applied via resistors R8 and R9, with diode X1 disabling the negative output from amplifier A5. Conversely, if fiber a is receiving more light than fiber b, so that the outputs of amplifiers A3 and A4 are negative, the positive output of amplifier A6 is proportional in magnitude to the current applied via resistors R6 and R7.

The output signal from potentiometer PA is also applied through noninverting amplifier A7 to one input line of NAND gate NG1, and the output of amplifier A5 is applied to the other input line of gate NG1 via diode X3. If the light received via fiber a is sufficiently great, so that the output voltage from amplifier A7 exceeds the gate NG1 input threshold voltage, and if the output of amplifier A5 is positive, indicating that fiber a is receiving more light than fiber b, both input terminals of gate NG1 will be high, driving the output of gate NG1 low. When the output of gate NG1 is low, diode X4 clamps the noninverting input terminal of amplifier A8 to a low voltage, preventing it from enabling NAND gate NG2, even if the output voltage of amplifier A2 should begin to increase by reason of more light being received through fiber b. The low logic signal from gate NG1 provides a high logic signal from logic inverter I1, providing a positive input signal to the non-inverting input terminal of amplifier A5 via diode X5 and resistor R5, and a positive output signal from output amplifier A6. Thus if the light received via fiber a becomes sufficiently great as lateral deviation occurs in the direction which causes a positive output from amplifier A6, the enabling of gate NG1 maintains the output of amplifier A6 positive even if greater lateral deviation in the same direction then causes the output of differential amplifier A3 to become very small or even zero. The amount which the error signal is augmented when gate NG1 is enabled can be governed, of course, by selection of resistor R5. The value of lateral deviations at which gate NG1 is enabled may be selected, of course, by selection of the gain of amplifier A7. The gain of amplifier A7 must be enough so that gate NG1 will be enabled when the amount of light recieved by fiber a is at least less than the maximum amount of light which can be received by fiber a, of course, and thus gate NG1 turns on when at least some of the area viewed by fiber a is occluded by dark line L. Diode X8 insures that gate NG1 will remain enabled even if noise or jitter should cause the output of amplifier A5 to briefly fall to a low value. The continuous provision of a positive output signal from amplifier A6 no matter how large a lateral deviation may occur causes servomotor SM to reposition web W in a direction so as to reduce the lateral deviation. When deviation is decreased sufficiently, the amplifier A7 output drops below the gate NG1 input threshold level, disabling gate NG1. With the gate NG1 disabled, the output signal from amplifier A6 then varies proportionally with the output of differential amplifier A3.

Upon the occurrence of substantial lateral deviation in the opposite direction, similar operation occurs. When a sufficiently large amount of light is first received via fiber b, the output voltages of amplifiers A2 and A8 become large enough to enable NAND gate NG2, thereby clamping the amplifier A7 output to a small value by means of diode X6, and causing logic inverter I2 to apply a positive signal via resistor R10 to the inverting input terminal of amplifier A6, maintaining the output voltage of amplifier A6 negative even if deviation temporarily increases to an amount which causes the differential amplifier A3 output to decrease. A typical manner in which the error signal may be made to increase as gate NG1 or gate NG2 is enabled is shown by dashed line $d_2$ and $d_3$ in FIG. 2c. At extreme deviations the error signal output becomes flat by virtue of saturation in amplifier A6. Gate NG1 becomes disabled at a slightly lower voltage from amplifier A7 than the voltage at which that gate was enagled, and gate NG2 similarly becomes disabled at a slightly lower voltage from amplifier A8 than the voltage at which that gate was enabled, advantageously providing some hysteresis-like action, so that neither gate NG1 nor gate NG2 will flicker on and off at a borderline signal condition. Thus decreasing error signal portions of the characteristic are shown in FIG. 2c at $d_3$ and $d_4$.

Referring to FIG. 6, the reflected light transmitted through fibers d and e is coupled to phototransistors PRD and PTE, respectively. The output voltages from the emitters of the phototransistors are applied through voltage follower amplifiers A9 and A10, respectively, to excite respective potentiometers P5 and P6. The output signals from potentiometers P5 and P6 are applied via scaling resistors to the inverting input terminal of summing amplifier A11, and a reference voltage derived by means of potentiometer P7 and emitter follower Q4 is applied to the non-inverting input terminal of summing amplifier A11. When no dark indicium reduces the light reflected into fibers d and e, the signals applied to amplifier A11 from potentiometers P5 and P6 exceed the reference signal from Q4, holding the A11 amplifier output negative, and terminal 21 is held clamped near zero volts by diode X9, insuring that NAND gate NG3 is disabled, and that NAND gate NG4 is enabled, to provide a low logic signal on terminal 22. The output voltages from potentiometers P5 and P6 are also applied to the non-inverting and inverting input terminals, respectively, of differential amplifier A12. When no dark indicium occludes light from fibers d and e, differential amplifier A12 provides a zero output signal.

When a target mark or indicium such as that shown at $M_1$ in FIG. 3b passes under the sensing head, a time occurs at which fiber d receives maximum light but fiber e receives much less light, which causes a positive voltage output from amplifier A12. A portion of the positive output voltage from amplifier A2 is applied via potentiometer P8, resistor R12 and four series diodes shown at X10 to charge capacitor C1. The voltage from the potentiometer is also simultaneously applied to the gate of PNP transistor Q5 via a lesser drop caused by diode X11, thereby causing transistor Q5 to remain cut off while capacitor C1 is being charged. When reflectance into fiber d also becomes occluded by indicium: $M_1$, the output signal from differential amplifier A12 decreases, and eventually it becomes too low to hold Q5 cut off. Current then flows from capacitor C1 through the emitter and collector circuits of Q5, providing a signal via resistor R13 to turn on transistor Q6. The Q6 collector is connected to the signal input terminal of monostable flip-flop FF1 via diode X12, so that the drop in the Q6 collector voltage as Q6 is turned on triggers flip-flop FF1, which may have a period of several seconds, for example, in a typical application. The set output line of monostable flip-flop FF1 is connected to conditionally enable NAND gate NG3, and hence positive pulses which later occur at terminal 21 while flip-flop FF1 is set will enable gate NG3, to disable gate NG4. The drop of the Q6 collector also applies a negative transition pulse to the trigger input line of monostable flip-flop FF2, providing a brief "sync" output signal (typically one millisecond duration, for example) at terminal 23.

Assume that during the time flip-flop FF1 is set to conditionally enable gate NG3, that indicia of the nature of lines E1 to E5 (FIG. 1) successively pass under the sensing head. Because such indicia decrease the light through fibers d and e in a similar manner at the same time, no appreciable output signal will occur from differential amplifier A12 as such indicia are sensed, and hence neither monostable flip-flop will be re-triggered. To further insure that flip-flop FF2 cannot be re-triggered during the FF1 set period, the set output voltage from FF1 is applied via resistor R14 to charge capacitor C2, and the positive voltage across C2 is applied via diode X13 to the trigger input line of flip-flop, so that even if transistor Q6 were cut off by a signal from differential amplifier A12, the capacitor C2 voltage will prevent FF2 from being triggered again, while FF1 is set. However, when FF1 resets, dropping the voltage across capacitor C2, a later signal of sufficient magnitude from differential amplifier A12 will be able to trigger FF2 to provide another synchronization pulse.

As successive indicia such as E1 to E5 (FIG. 1) pass beneath the sensing head while FF1 is set, the successive momentary drips in the output voltages of amplifiers A9 and A10 cause successive positive output pulse signals from amplifier A11 and at terminal 21. Each such pulse signal momentarily enables gate NG3, thereby providing a brief positive "event" pulse at output terminal 22. The sync signals at terminal 23 and the event signals may be used to control a wide variety of different devices in different applications, including both devices which perform functions the web and devices which perform other functions in synchronism with the reeling of the web.

In certain applications, such as where web W is driven at substantially different speeds at different times, it may be desirable to make the set period of pulser FF1 vary inversely with web speed. A voltage commensurate with web travel speed may be provided by means of a tachometer generator (not shown), for example, attached to roll 11 (FIG. 1), and that voltage may be applied to vary the period of FF1 in a variety of known ways.

In one possible modification of FIG. 5 illustrated in FIG. 7, the differential amplifier A3' comprises a variable gain operational amplifier, the gain of which is varied from a reference value by variation in the output voltage from amplifier AO. Amplifier AO sums the output voltages of voltage follower amplifiers A1 and A2, and hence provides a gain control voltage inversely commensurate with the total amount of light transmitted through both fibers a and b. As the total light decreases, the gain of differential amplifier A3' is increased. Such an arrangement serves to linearize the proportional part of the error signal versus lateral deviation characteristic. Diodes limit the output voltage swing of amplifier AO so that amplifier A3' has a fixed gain for extreme lateral deviation in either direction.

In another possible modification of FIG. 5 partially illustrated in FIG. 8, means are provided to "calibrate" the system by correcting the differences in the losses in fibers a and b and differences in the gains of photosensors PTA and PTB. The output of voltage follower A1 is applied to a variable-gain amplifier VGA, which is assumed to be non-inverting, and the output of amplifier VGA is applied to the differential amplifier A3''. The output of amplifier A2 is also applied to the differential amplifier. An electronic switch ES is arranged to close, either manually or when the event-sensing circuit of FIG. 6 senses the passage of an indicium which is located on the web or sheet W at a lengthwise portion which does not contain line L. Thus when switch ES is closed, fibers a and b are both transmitting maximum amounts of light to photosensors PTA and PTB, respectively. Under that condition the output voltages of voltage followers A1 and A2 will be equal if and only if the loss in fiber a times the gains of PTA and A1 equals the loss in fiber b times the gains of PTB and A2, and otherwise the voltages from A1 and A2 will differ. Assume that amplifier VGA initially has unity gain. If the voltage from A1 and A2 differ when switch ES is closed, the output from differential amplifier A3' will be finite. Amplifier AO greatly amplifies that voltage to charge capacitor CG of an integrator comprising amplifier A1 and capacitor CG, and the integrator output voltage is applied to control the gain of amplifier VGA. The gain of amplifier VGA is adjusted upwardly or downwardly from unity until the output voltage of differential amplifier A3" becomes insignificantly small. The overall gain from the remote end of fiber a to the inverting input terminal of differential amplifier A3" then equals the overall gain from the remote end of fiber b to the noninverting input terminal of amplifier A3". Upon opening of switch ES, the integrator output voltage holds the gain at the value established while the switch is closed, and tracking of line L then can occur. It will be apparent that means similar to that shown in FIG. 8 may be provided, if desired, to automatically establish equal gains in the signal channels for fibers d and e.

In FIG. 9a a modified form of sensing head SH' is shown as including fibers a, b and c, which function as in previously described Figures to provide a tracking error signal, but also a single-mode fiber g, the remote end of which is coupled to a laser (not shown). The tracking error signal derived from fibers a, b and the circuit of FIG. 5 is applied to motive means M to cause head SH' to track a curving line L on web W', the motive means adjusting the head in a direction perpendicular to web motion. The laser light emitted from fiber g thus cuts the web material along line L'. Fibers a, b, c and g extend upwardly from the sensing head as a light slack cable FC'. Because of the very light weight of the sensing head and cable FC', a given motive means can position the tracking and cutting head with wideband frequency response.

It is not strictly necessary in some applications that source fibers c and f be used, or at least be provided in the sensing head. A separate source (or sources) of light can be focused on the areas illuminated by figers c (and f), but the arrangements previously illustrated, wherein source fibers are fixed close to receiving fibers in the sensing head, are much preferred.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Optical sensing apparatus for sensing a line carried on a surface having a contrasting energy-reflective property, comprising in combination: first and second optic fibers each having a first end affixed to a sensing head member with the first ends of said fibers pointing in the same direction, and each having a second end, the first ends of said fibers being spaced apart at a distance such that said line affects direct reception of reflected light by each of said fibers when a midpoint between said fibers is centered over said line; first and second photosensors, each of said photosensors being connected to receive light from the second end of a respective one of said optic fibers and to provide a respective electrical signal commensurate with the amount of light directly reflected into said respective one of said optic fibers; and a differential amplifier connected to provide an output signal commensurate with the difference between said photosensor electrical signals.

2. Apparatus according to claim 1 having a third optic fiber having a first end affixed to said sensing head member and a second end; and a light source connected to apply light to said second end of said third fiber, said first ends of said first and second fibers being spaced on said sensing head member at equal distances on opposite sides of a reference line through the center of said first end of said third floor.

3. Apparatus according to claim 1 wherein said first, second and third fibers have the centers of their first ends spaced in a triangular configuration.

4. Apparatus according to claim 1 having second amplifier means for amplifying said output signal from said differential amplifier means; first means responsive to the electrical signal of said first photosensor and operative when said electrical signal of said first photosensor exceeds a predetermined magnitude and the output of said differential amplifier has a first polarity for applying a predetermined input signal to said second amplifier means; and second means responsive to the electrical signal of said second photosensor, and operative when said electrical signal of said second photosensor exceeds a predetermined magnitude and the output of said second amplifier has a second polarity opposite in sense from said first polarity for applying a predetermined input signal to said second amplifier means.

5. Apparatus according to claim 4 wherein said first means includes first coincidence gate means and said second means includes second coincidence gate means, the output of said first gate means being connected to disable said second gate means upon enabling of said first gate means, and the output of said second gate means being connected to disable said first gate means upon enabling of said second gate means.

6. Optical sensing apparatus for sensing a line carried on a surface having a contrasting energy-reflective property, comprising, in combination: a trio of flexible optical fibers, including a source fiber and a pair of receiving fibers; a member affixing a first end of each of said fibers in a triangular pattern with said first ends of said receiving fibers being spaced sufficiently closely together that said line affects direct reception of reflected light by each of said fibers when a midpoint between said receiving fibers is centered over said line; means for applying light to the second end of said source fiber; photosensor means responsive to the amounts of light directly reflected into and transmitted to the second ends of said receiving fibers for providing a pair of electrical signals each proportional to the amount of light directly reflected into a respective one of said receiving fibers; and means for differentially combining said electrical signals to provide an output signal.

7. Apparatus according to claim 6 wherein said first ends of said fibers are contiguous.

8. Apparatus according to claim 6 wherein said first ends of said receiving fibers are spaced equal distances from the center of said first end of said source fiber.

* * * * *